June 14, 1927.
H. L. STAFFORD
1,632,200
MACHINE TO DECAPITATE AND CLEAN FISH
Filed Aug. 23, 1926
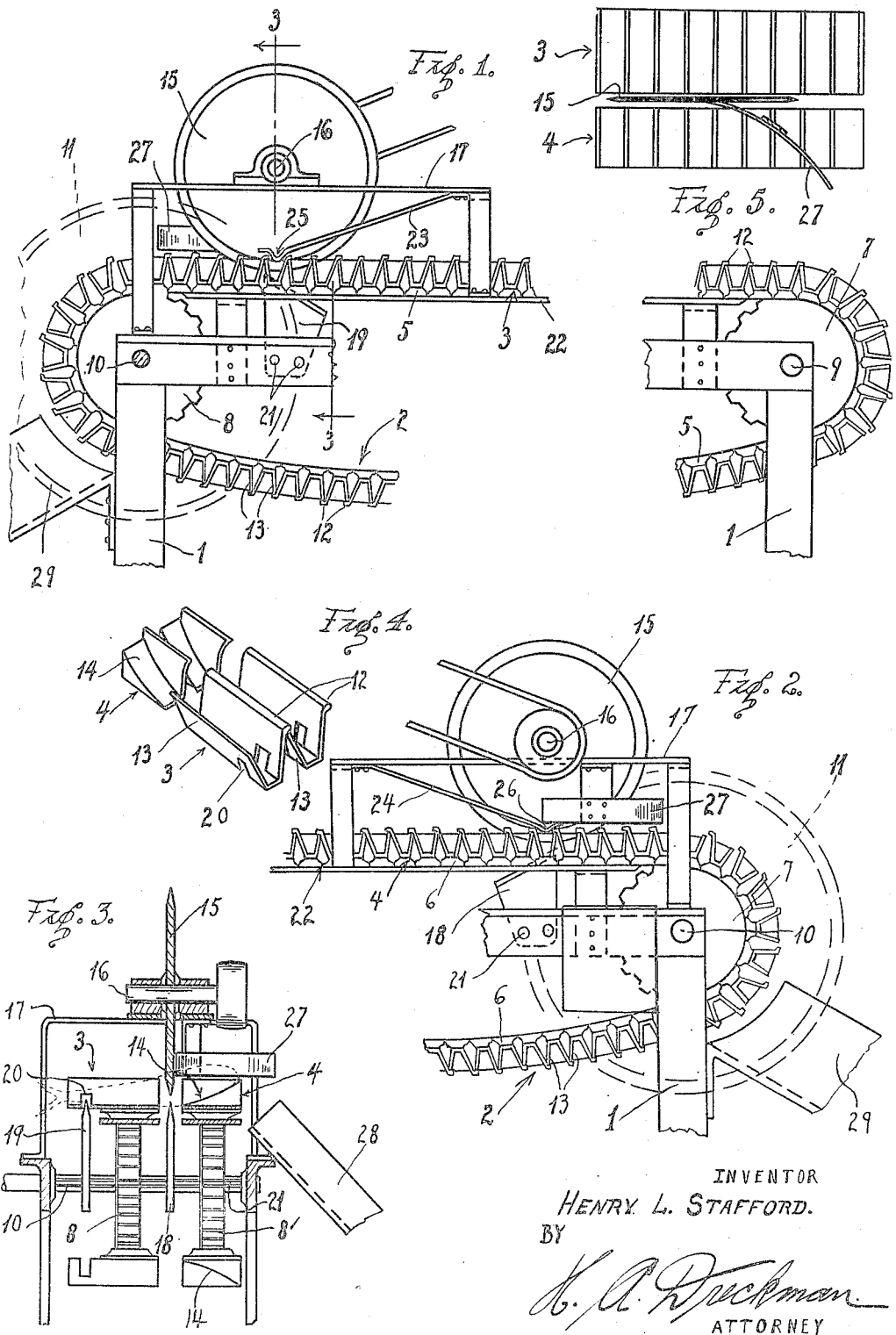
INVENTOR
HENRY L. STAFFORD.
BY
ATTORNEY Patented June 14, 1927.

1,632,200

UNITED STATES PATENT OFFICE.

HENRY L. STAFFORD, OF LONG BEACH, CALIFORNIA.

MACHINE TO DECAPITATE AND CLEAN FISH.

Application filed August 23, 1926. Serial No. 130,814.

An object of my invention is to provide a machine which will unfailingly decapitate and clean each fish of entrails as it passes through the machine.

Another object is to provide a machine, in which the workman cannot be injured.

Another object is to provide a machine for the purpose stated which is simple in construction and effective in operation.

Other objects, advantages and features of invention may appear from the accompanying drawing, the subjoined detailed description, the appended claims, or in the operation of the machine.

In the drawing:

Fig. 1 is a fragmentary side elevation of my machine.

Fig. 2 is a fragmentary side elevation of the machine, looking from the other side in Fig. 1.

Fig. 3 is a sectional view on line 3—3, Fig. 1.

Fig. 4 is a perspective view of the fish holding cups.

Fig. 5 is a diagrammatic plan view showing the arrangement of the rotating knife and wedge plate.

Referring more particularly to the drawing: My machine comprises a frame 1, upon which the conveyor 2 is mounted. This conveyor comprises two spaced sets of fish holding cups 3, 4, which cups are mounted on any well known type of chains, 5, 6. The chains 5—6 travel over the front sprockets 7—7' and rear sprockets 8—8', which sprockets are secured to shafts 9—10 respectively, journaled in the frame 1. The shaft 9 and thence the conveyor 2 is rotated by a pulley 11 on said shaft, which is driven from any suitable source of power.

The cups 3 are formed substantially V-shaped to receive the fish, the rear wall of each of which are formed with an overhanging lip 12, which fits over the front wall 13 of the adjacent cup to eliminate the danger of catching the operator's fingers between the cups. The cups 4 are each provided with an upwardly sloping bottom 14 to hold the head of the fish up, as will be further described.

A disc knife 15 is mounted on a shaft 16 which is journaled in a sub frame 17 and rotated by any suitable power. This knife extends between the two sets of cups 3, 4 and is adapted to cut through the backbone of the fish back of the head. A stationary knife 18 is positioned below the disc 15 and in line therewith, and is adapted to make an incision in the belly of the fish. A second stationary knife 19 extends upwardly through slots 20 in the cups 3, to make an incision at the rear of the fish and sever a tough tube so that the head and attached entrails will more readily pull away. The knives 18—19 are both mounted on rods 21 secured to the frame 1.

The upper reach of the conveyor 2 travels on a plate 22 to prevent sagging. To securely hold the fish in place while being operated upon by the knives 15, 18 and 19, I provide spring fingers 23 and 24, secured to the subframe 17 and positioned on either side of the knife 15 to act on the cups 3—4 respectively. These fingers are each formed with a downwardly looped end 25, 26 which enters the cups 3—4 to press on the fish.

After the fish has been acted upon by the knives 15, 18, 19, the conveyor 2 carries the same against a wedge plate 27, the one end of which bears against the disc 15 just above the cups 4. The end of the plate 27 enters the cut made by the knife 15 and its wedge shape pulls the head and the entrails attached thereto away from the body. The head falls onto a chute 28 at the side of the machine and is led away, while the body part spills off of the end of the machine out of the cups 3 onto a chute 29, for canning or other use.

My machine is particularly applicable to sardines, herring and similar fish. The fish are fed into the cups 3, 4 by a workman with the backs up, and the head on the slope 14. The object of the slope 14 is to hold up the head so that it will engage the wedge plate 27 for the purpose previously stated.

Having described my invention, I claim:

1. A machine to decapitate and clean fish comprising a frame, a conveyor, means to rotate said conveyor; fish receiving cups on said conveyor, a knife above said conveyor adapted to cut into the fish through the back bone, and a wedge plate adapted to enter the cut made by said knife to pull off the head and entrails of the fish.

2. A machine to decapitate and clean fish comprising a frame, a conveyor, means to rotate said conveyor; fish receiving cups on said conveyor, a knife above said conveyor adapted to cut into the fish, and a wedge plate adapted to enter the cut made by said knife to pull off the head and entrails of the fish, and spring fingers adapted to bear upon the fish to hold the same while being acted upon by the knife.

3. A machine to decapitate and clean fish comprising a frame, a conveyor, means to rotate said conveyor, the conveyor consisting of spaced cups, adapted to carry the head and body of the fish respectively, the body carrying cups being formed with an overhanging lip to overhang the wall of the adjacent cup, a knife above the conveyor adapted to cut into the fish, and a wedge plate adapted to enter the cut made by said knife to pull off the head and entrails of the fish.

4. A machine to decapitate and clean fish comprising a frame, a conveyor, means to rotate said conveyor, the conveyor consisting of spaced cups, adapted to carry the head and body of the fish respectively, the body carrying cups being formed with an overhanging lip to overhang the wall of the adjacent cup, the head carrying cups being formed with an upwardly sloping bottom to hold up the head of the fish, a knife above the conveyor adapted to cut into the fish, and a wedge plate adapted to enter the cut made by said knife to pull off the head and entrails of the fish.

5. A machine to decapitate and clean fish comprising a frame, a conveyor, means to rotate said conveyor, the conveyor consisting of spaced cups, adapted to carry the head and body of the fish respectively, the body carrying cups being formed with an overhanging lip to overhang the wall of the adjacent cup, the head carrying cups being formed with an upwardly sloping bottom to hold up the head of the fish, a knife above the conveyor adapted to cut into the fish, and a wedge plate adapted to enter the cut made by said knife to pull off the head and entrails of the fish, and spring fingers adapted to bear upon the fish to hold the same while being acted upon by the knife.

6. A machine to decapitate and clean fish comprising a frame, a conveyor, means to rotate said conveyor, the conveyor consisting of spaced cups, adapted to carry the head and body of the fish respectively, a knife above the conveyor and extending between the cups, a knife below the conveyor in line with the first named knife, and a wedge plate bearing against said first named knife, adapted to enter the cut made thereby and pull off the head and entrails of the fish.

7. A machine to decapitate and clean fish comprising a frame, a conveyor, means to rotate said conveyor, the conveyor consisting of spaced cups, adapted to carry the head and body of the fish respectively, a knife above the conveyor and extending between the cups, a knife below the conveyor in line with the first named knife, and a wedge plate bearing against said first named knife, adapted to enter the cut made thereby and pull off the head and entrails of the fish, and a third knife adapted to make an incision at the rear of the fish.

8. A machine to decapitate and clean fish comprising a frame, a conveyor, means to rotate said conveyor, the conveyor consisting of spaced cups, adapted to carry the head and body of the fish respectively, a knife above the conveyor and extending between the cups, a knife below the conveyor in line with the first named knife, and a wedge plate bearing against said first named knife, adapted to enter the cut made thereby and pull off the head and entrails of the fish, and a third knife adapted to make an incision at the rear of the fish, and spring fingers adapted to bear upon the fish to hold the same while being acted upon by the knife.

9. A machine to decapitate and clean fish comprising a frame, a conveyor, means to rotate said conveyor, the conveyor consisting of spaced cups, adapted to carry the head and body of the fish respectively, the body carrying cups being formed with an overhanging lip to overhang the wall of the adjacent cup, the head carrying cups being formed with an upwardly sloping bottom to hold up the head of the fish, a knife above the conveyor adapted to cut into the fish, and a wedge plate adapted to enter the cut made by said knife to pull off the head and entrails of the fish, a second knife below the conveyor and in line with the first named knife, and a third knife adapted to make an incision at the rear of the fish.

In testimony whereof, I affix my signature.

HENRY L. STAFFORD.